(12) United States Patent
Zhang et al.

(10) Patent No.: US 11,747,978 B2
(45) Date of Patent: Sep. 5, 2023

(54) DATA COMPACTION IN DISTRIBUTED STORAGE SYSTEM

(71) Applicant: International Business Machines Corporation, Armonk, NY (US)

(72) Inventors: Jun Wei Zhang, Shanghai (CN); Lei Chen, Shanghai (CN); Zhongen Zhang, Shanghai (CN); Zhi Bin Pan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 16/519,341

(22) Filed: Jul. 23, 2019

(65) Prior Publication Data

US 2021/0026537 A1    Jan. 28, 2021

(51) Int. Cl.
*G06F 3/06* (2006.01)

(52) U.S. Cl.
CPC ............ *G06F 3/0608* (2013.01); *G06F 3/064* (2013.01); *G06F 3/067* (2013.01); *G06F 3/0643* (2013.01); *G06F 2212/7205* (2013.01)

(58) Field of Classification Search
CPC ...... G06F 3/0608; G06F 3/064; G06F 3/0643; G06F 2212/7205
USPC .......................................................... 707/692
See application file for complete search history.

(56) References Cited

U.S. PATENT DOCUMENTS

| | | | |
|---|---|---|---|
| 7,039,781 B2 | 5/2006 | Iwata et al. | |
| 8,533,158 B1 | 9/2013 | Rao | |
| 9,582,527 B2 | 2/2017 | Ramnarayanan et al. | |
| 9,792,298 B1 | 10/2017 | Taylor et al. | |
| 2013/0124483 A1 | 5/2013 | Furuhashi et al. | |
| 2015/0339314 A1* | 11/2015 | Collins | G06F 16/1744 707/627 |
| 2016/0092128 A1* | 3/2016 | Jain | G06F 3/0688 711/103 |
| 2016/0275094 A1* | 9/2016 | Lipcon | G06F 16/278 |

(Continued)

OTHER PUBLICATIONS

Ahmad et al., "Compaction Management in Distributed Key-Value Datastores", Proceedings of the VLDB Endowment, 41st International Conference on Very Large Data Bases, Aug. 31-Sep. 4, 2015, Kohala Coast, Hawaii, vol. 8, No. 8, Copyright 2015 VLDB Endowment 21508097/15/04, pp. 850-861.

(Continued)

*Primary Examiner* — Hosain T Alam
*Assistant Examiner* — Nicholas E Allen
(74) *Attorney, Agent, or Firm* — Monchai Chuaychoo

(57) ABSTRACT

Embodiments of the present invention relate to a method, system, and computer program product for compacting data in a distributed storage system. In some embodiments, a method is disclosed. According to the method, first information about historical resource usage of a data node and second information about a historical data compaction performed at the data node are obtained. The historical data compaction compacted data files associated with a first database table into one data file. A configuration for a data compaction to be performed on a plurality of data files associated with a second database table is generated based on the first and second information. The data compaction is performed during a future time period. In other embodiments, a system and a computer program product are disclosed.

20 Claims, 9 Drawing Sheets

(56) References Cited

U.S. PATENT DOCUMENTS

| | | | | |
|---|---|---|---|---|
| 2017/0031959 | A1* | 2/2017 | Zayas | G06F 16/1727 |
| 2018/0121295 | A1* | 5/2018 | Ramamurthi | G06F 11/1461 |
| 2018/0139309 | A1* | 5/2018 | Pasam | H04W 4/70 |
| 2018/0167263 | A1* | 6/2018 | Patel | H04L 47/193 |
| 2018/0203640 | A1 | 7/2018 | Chen et al. | |
| 2018/0341606 | A1* | 11/2018 | Bolkhovitin | G06F 3/0656 |
| 2019/0004739 | A1* | 1/2019 | Tang | G11B 5/012 |
| 2019/0065078 | A1* | 2/2019 | Yerfule | G06F 9/4881 |

OTHER PUBLICATIONS

Mell et al., "The NIST Definition of Cloud Computing", U.S. Department of Commerce, Special publication 800-145, Sep. 2011, 7 pages.

\* cited by examiner

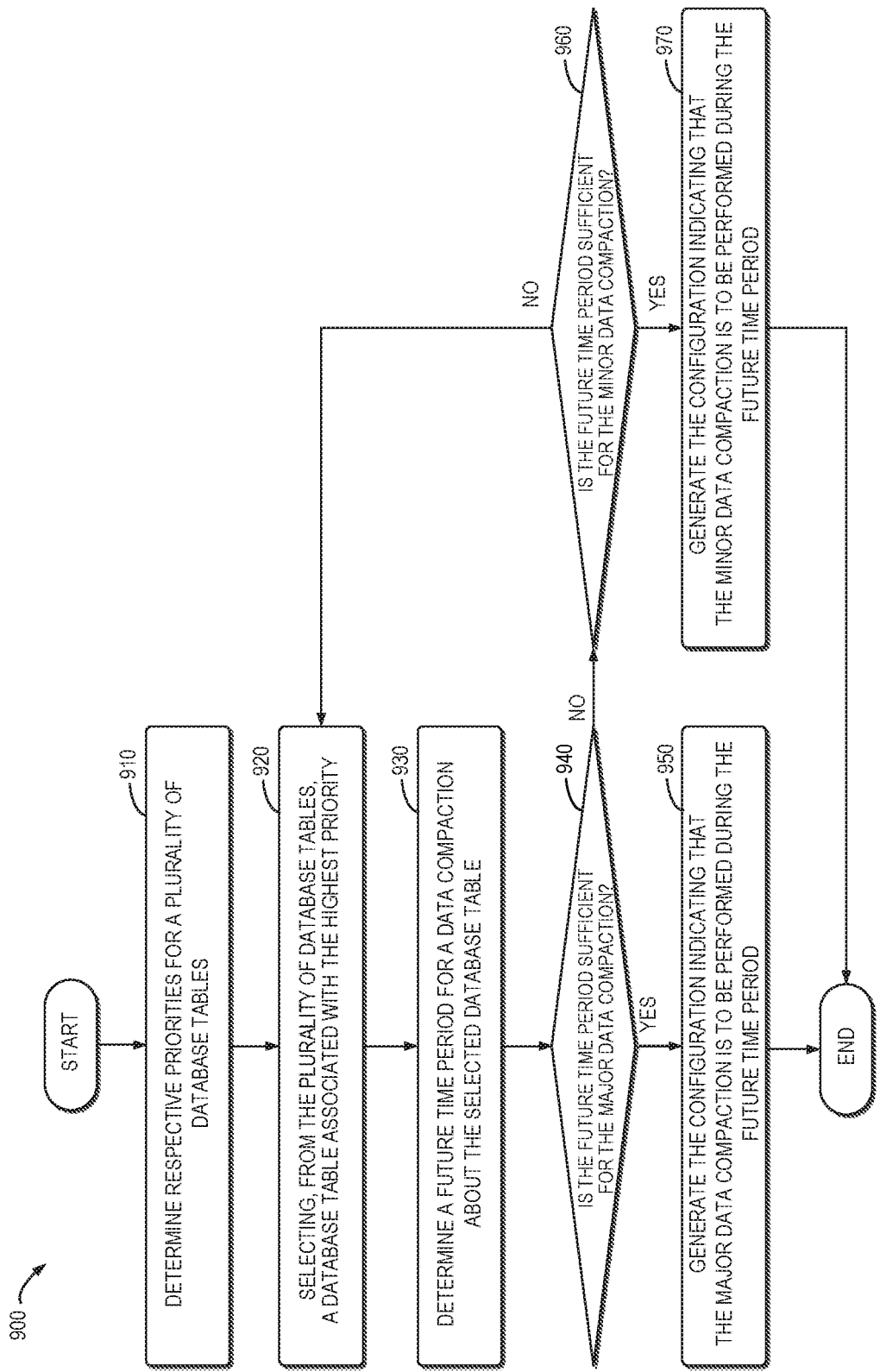

DATA COMPACTION IN DISTRIBUTED STORAGE SYSTEM

BACKGROUND

The present invention generally relates to distributed system management, and more specifically, to a method, system, and computer program product for compacting data in a distributed storage system.

In a distributed storage system, sometimes data files associated with a same database table are combined into one data file, so as to achieve optimal read performance. This process is called data compaction.

SUMMARY

According to one embodiment of the present invention, there is provided a computer-implemented method. The method comprises obtaining first information about historical resource usage of a data node and second information about a historical data compaction performed at the data node, the historical data compaction compacting data files associated with a first database table into one data file. The method further comprises generating a configuration for a data compaction to be performed on a plurality of data files associated with a second database table based on the first and second information, the configuration indicating that at least a part of the plurality of data files are to be compacted into one data file during a future time period. In addition, the method comprises performing the data compaction during the future time period based on the configuration.

According to another embodiment of the present invention, there is provided a system. The system comprises a processing unit and a memory coupled to the processing unit. The memory stores instructions that, when executed by the processing unit, perform actions comprising: obtaining first information about historical resource usage of a data node and second information about a historical data compaction performed at the data node, the historical data compaction compacting data files associated with a first database into one data file; generating a configuration for a data compaction to be performed on a plurality of data files associated with a second database table based on the first and second information, the configuration indicating that at least a part of the plurality of data files are to be compacted into one data file during a future time period; and performing the data compaction during the future time period based on the configuration.

According to yet another embodiment of the present invention, there is provided a computer program product. The computer program product is tangibly stored on non-transient machine-readable medium and comprises machine-executable instructions. The machine-executable instructions, when executed on a device, cause the device to perform acts comprising: obtaining first information about historical resource usage of a data node and second information about a historical data compaction performed at the data node, the historical data compaction compacting data files associated with a first database table into one data file; generating a configuration for a data compaction to be performed on a plurality of data files associated with a second database table based on the first and second information, the configuration indicating that at least a part of the plurality of data files are to be compacted into one data file during a future time period; and performing the data compaction during the future time period based on the configuration.

According to an aspect of the present invention, there is a method, computer program product and/or system that performs the following operations (not necessarily in the following order): (i) obtaining a first information data set including information indicative of historical resource usage of a data node and a second information data set including information indicative of a historical data compaction performed at the data node, the historical data compaction compacting data files associated with a first database table into one data file; (ii) generating a configuration data set for a data compaction to be performed on a plurality of data files associated with a second database table based on the first and second information data sets, the configuration data set indicating that at least a part of the plurality of data files are to be compacted into one data file during a future time period; and (iii) performing the data compaction during the future time period based on the configuration data set.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 9 depicts a flowchart of a method 900 for generating a configuration for a data compaction according to embodiments of the present disclosure.

Throughout the drawings, same or similar reference numerals represent the same or similar elements.

DETAILED DESCRIPTION

Figure 1:
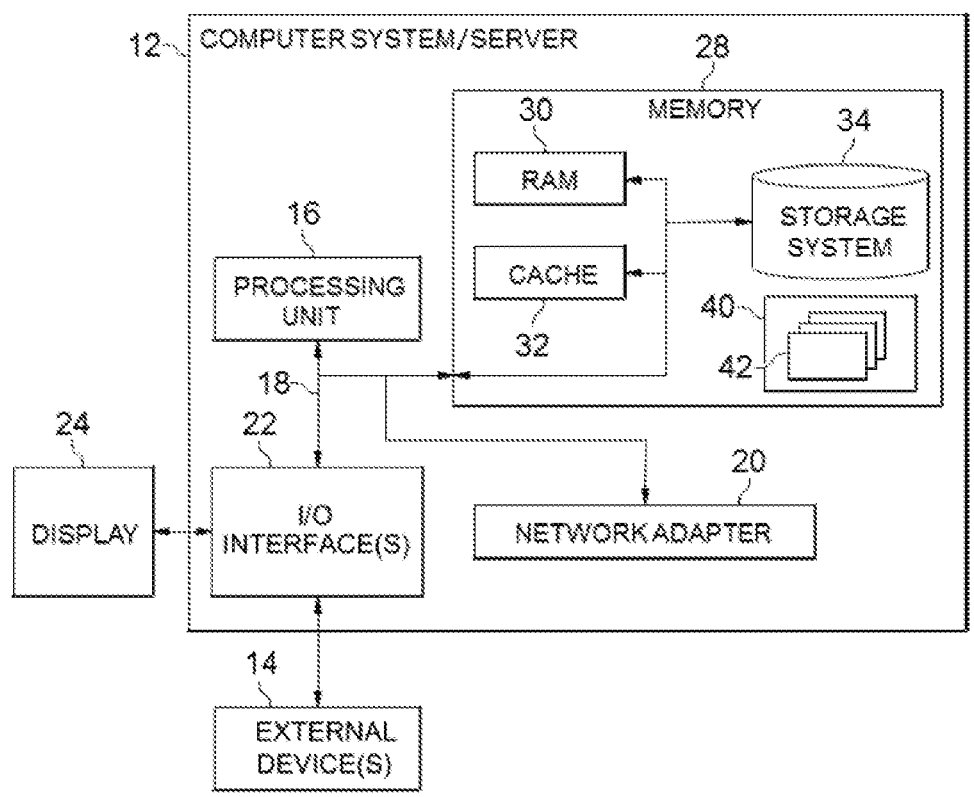
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, etc.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

Figure 2:
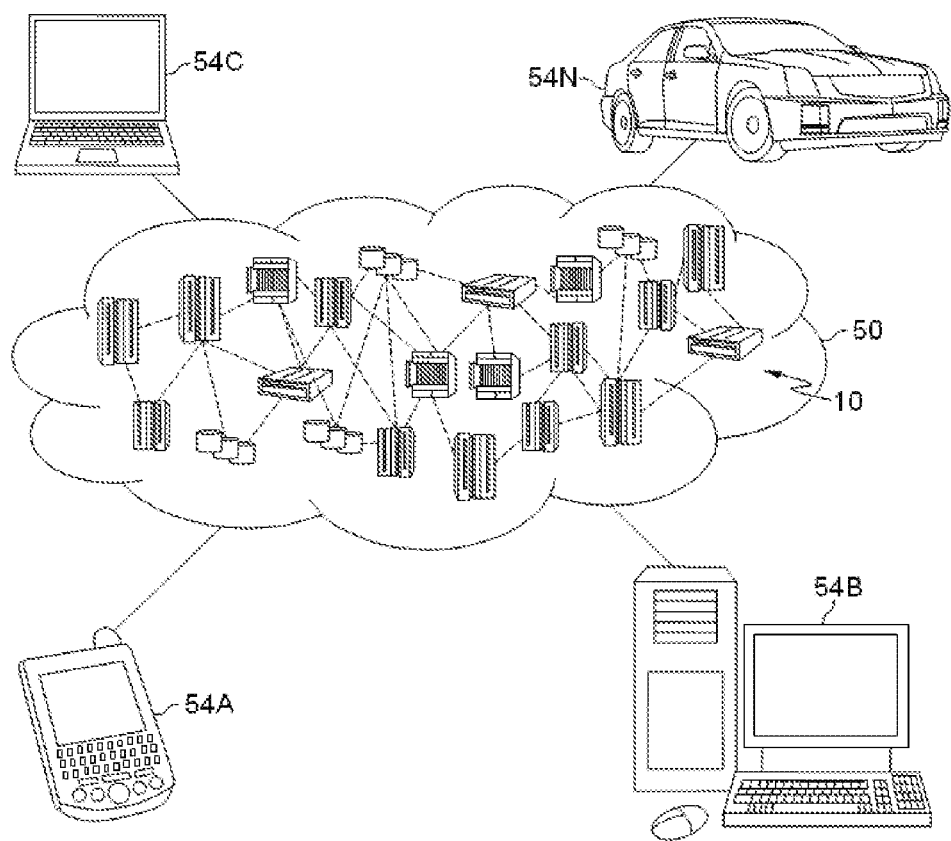
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10, which local computing devices used by cloud consumers, such as personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
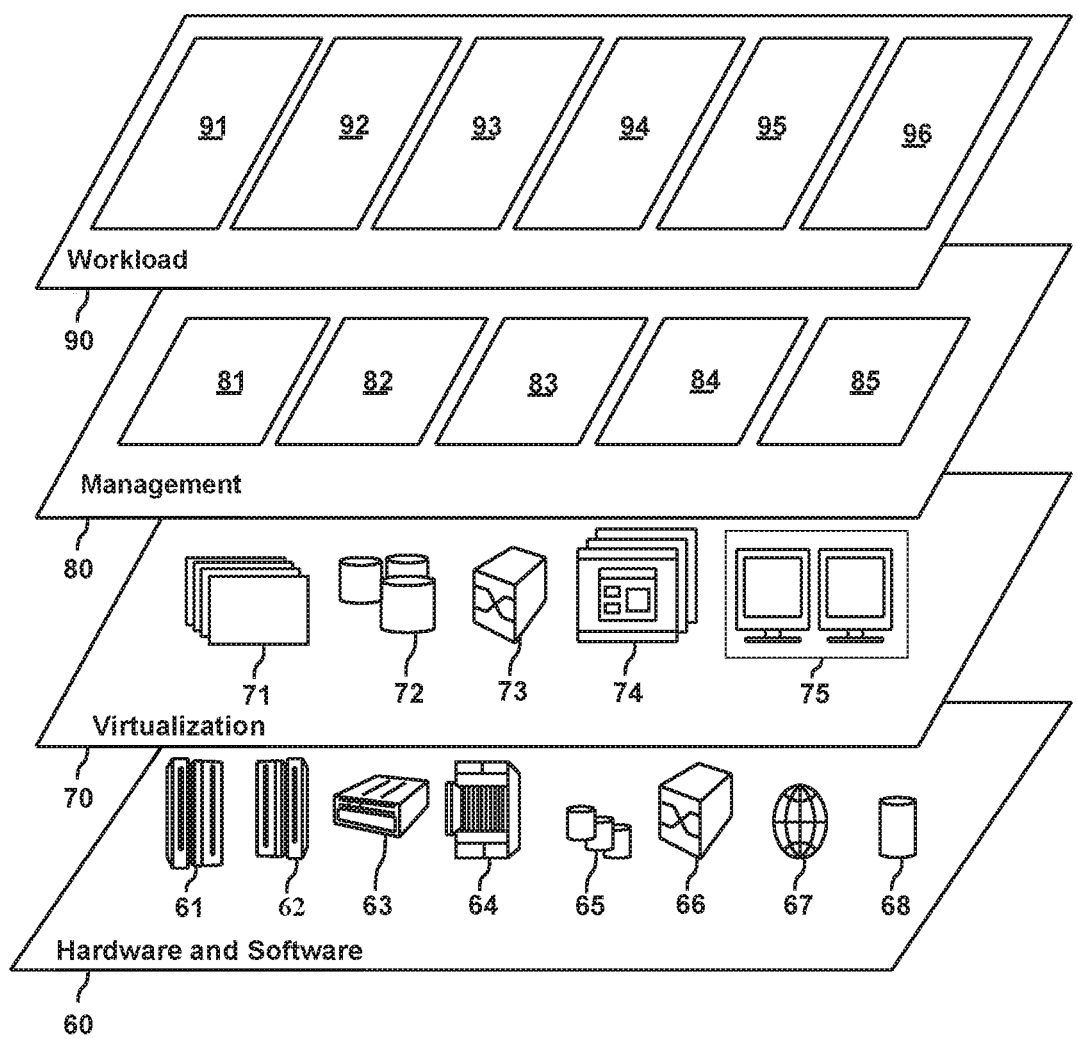
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data compaction 96. Hereinafter, reference will be made to FIG. 4 to FIG. 9 to describe details of the data compaction 96.

As described above, in a distributed storage system (such as, HBase) based upon a log-structured merge tree, optimal read performance would come from having only one data file per database table. However, this ideal is not possible during periods of parallel incoming writes. For example, different writes to a same database table may write data records into different data files. In this event, the distributed storage system will try to combine data files to reduce the number of disk seeks that are needed for an access. This process is called data compaction. The data compaction may compete CPU, memory, disk resources with business processes. Therefore, how to optimize the data compaction is a big problem.

In traditional solutions, such optimization of the data compaction is usually performed in a manually predefined/static way. They may not work well when external pressure to the distributed storage system varies dynamically. In some cases, the data compaction may consume too many resources, which may heavily impact the performance of the business processes.

In order to at least partially solve the above and other potential problems, embodiments of the present invention provide a new solution for compacting data in a distributed storage system. According to embodiments of the present disclosure, information about historical resource usage at a data node and information about historical data compactions performed at the data node can be collected. The collected information can be analyzed to figure out the usage pattern of resources at the data node and the capability of the data node to perform a minor compaction or a major compaction. A configuration for a data compaction to be performed at the data node can be generated based on the result of the analysis. The data compaction will be performed based on the generated configuration. As such, the resource usage will be considered when performing a data compaction, such that the data compaction will have minimal impact on the performance of the business processes. Moreover, by estimating the resource usage pattern in the future, the workload of the distributed storage system can be adjusted more efficiently.

Figure 4:
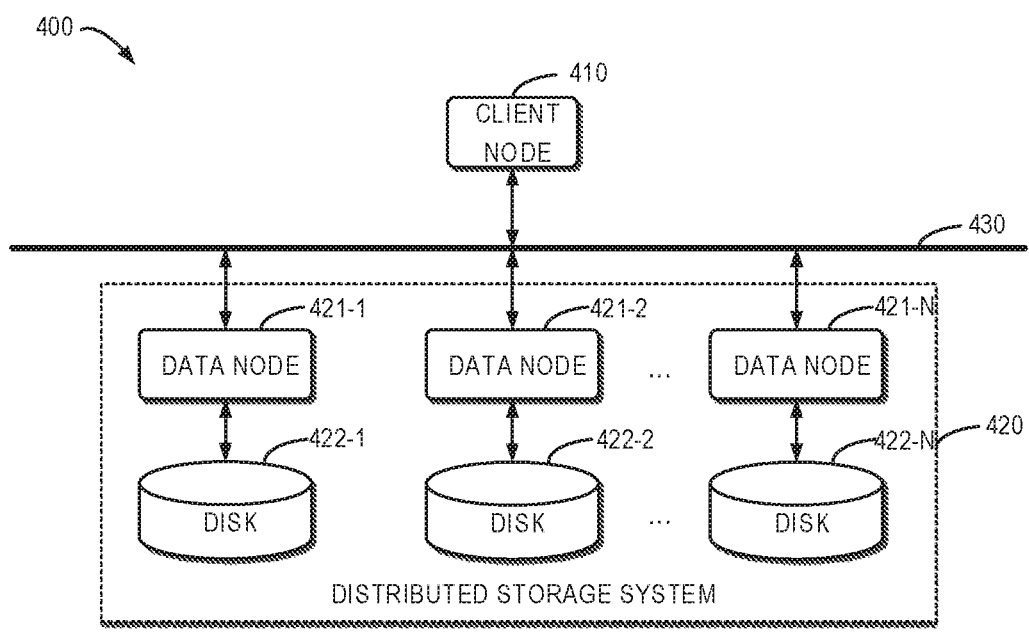
FIG. 4 depicts an example environment in which embodiments of the present invention can be implemented.

With reference now to FIG. 4, an environment 400 in which some embodiments of the present disclosure can be implemented is shown. It is to be understood that the structure and functionality of the environment 400 are described only for the purpose of illustration without suggesting any limitations as to the scope of the present disclosure. Some embodiments of the present disclosure can be embodied with a different structure and/or functionality.

In FIG. 4, the environment 400 is shown to include a client node 410 and a distributed storage system 420. The client node 410 may be communicatively coupled with the distributed storage system 420 via a network 430, such as Internet. One or more client applications may run at the client node 410, which may read data from the distributed storage system 420 and/or write data into the distributed storage system 420. In some embodiments, the client node 410 may be implemented by a physical device or a virtual machine. For example, the client node 410 may be implemented by computer system/server 12 as discussed with reference to FIG. 1.

As shown in FIG. 4, the distributed storage system 420 may include a plurality of data nodes 421-1, 421-2 . . . 421-N (collectively referred to as "data nodes 421" or individually referred to as "data node 421", where N≥1). Each data node 421 may be coupled with one or more disks for data storage. For example, as shown in FIG. 4, the data node 421-1 may be coupled with a disk 422-1; the data node 421-2 may be coupled with a disk 422-2; and the data node 421-N may be coupled with a disk 422-N, etc. In some embodiments, the data node 421 may be implemented by a physical device or a virtual machine. For example, the data node 421 may be implemented by computer system/server 12 as discussed with reference to FIG. 1. It is to be understood that, the number of client nodes and/or the number of data nodes shown in FIG. 4 are merely for the purpose of illustration, without suggesting any limitation to the present disclosure.

In some embodiments, the distributed storage system 420 may distribute one or more database tables having multiple data records for storage among the data nodes 421. For example, each data node 421 may store data records associated with one or more database tables. In some embodiments, the distributed storage system 420 may partition a large database table have multiple data records into a plurality of logical regions, each of which may be treated as a small database table. The distributed storage system 420 may distribute the plurality of logical regions among the plurality of data nodes 421. For example, each data node 421 may store data records associated with one or more regions.

In the following, it is assumed that each data node 421 stores data records associated with one or more database tables. It is to be understood that, the "database table" as used herein can refer to a real database table, or a logical region of a real database table. The scope of the present disclosure is not limited in this aspect.

As described above, during periods of parallel incoming writes, different writes to a same database table (or a same region of a database table) may write data records into different data files. For example, if the client node 410 initiates parallel incoming writes to a database table stored at the data node 421-1, data records from the client node 410 may be written into different data files at the data node 421-1. In order to achieve optimal read performance, the data node 421-1 may perform one or more data compactions to compact these data files associated with the same database table into one data file. In some embodiments, the data compaction preformed at the data node 421-1 can be divided into two different types, called "major compaction" and "minor compaction". The major compaction may compact all of a plurality of data files associated with a database table into one data file, and the minor compaction may compact only a part of the plurality of data files associated with the database table into one data file, where "part of the plurality of data files" includes a minimum of at least one data file of the plurality of data files and a maximum of all but one data file of the plurality of data files.

Figure 5:
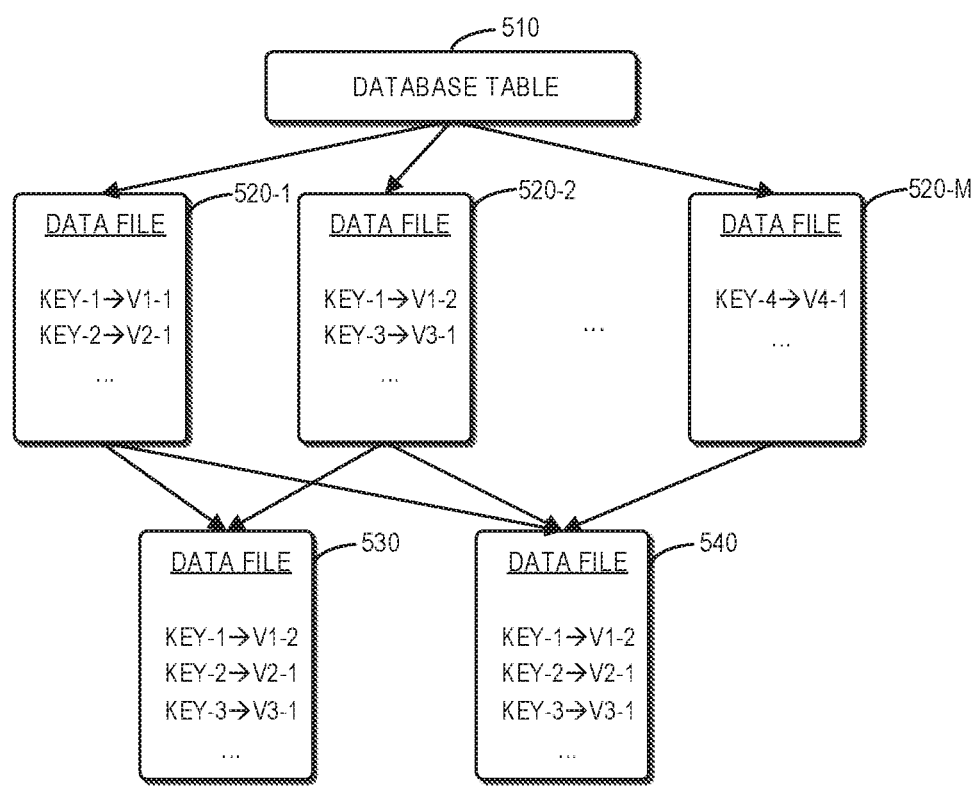
FIG. 5 depicts example diagrams of a major data compaction and a minor data compaction according to embodiments of the present disclosure.

FIG. 5 depicts example diagrams of these two different data compactions according to embodiments of the present disclosure. As shown in FIG. 5, a database table 510 may be stored at a data node 421. Data records associated with the database table 510 may be written into a plurality of data files 520-1, 520-2 . . . 520-M (collectively referred to as "data files 520" or individually referred to as "data file 520", where M≥1). For example, the data file 520-1 may include data entries "KEY-1→V1-1", "KEY-2→V2-1" and so on. The data entry "KEY-1→V1-1" may refer to a first key (that is, "KEY-1") and a first version of a first value (that is, "V1-1") associated with the first key, while the data entry "KEY-2→V2-1" may refer to a second key (that is, "KEY-2") and a first version of a second value (that is, "V2-1") associated with the second key. The data file 520-2 may include data entries "KEY-1→V1-2", "KEY-3→V3-1" and so on. For example, the data entry "KEY-1→V1-2" may refer to the first key (that is, "KEY-1") and a second version of the first value (that is, "V1-2") associated with the first key, while the data entry "KEY-3→V3-1" may refer to a third key (that is, "KEY-3") and a first version of a third value (that is, "V3-1") associated with the third key. The data file 520-M may include a data entry "KEY-4→V4-1", which may refer to a fourth key (that is, "KEY-4") and a first version of a fourth value (that is, "V4-1") associated with the fourth key.

In some embodiments, for example, the data node 421 may perform a minor compaction to compact a part of the data files 520 into one data file. For example, as shown in FIG. 5, the minor compaction may compact the data files 520-1 and 520-2 into one data file 530. The data file 530 may include data entries "KEY-1→V1-2", "KEY-2→V2-1", "KEY-3→V3-1" and so on. Since there are more than one version of the first value associated with the first key (that is, "KEY-1") in the data files 520-1 and 520-2, such as "KEY-1→V1-1" and "KEY-1→V1-2", the data file 530 may include only the most recent version of the first value associated with the first key, that is, "KEY-1→V1-2". Alternatively, the data node 421 may perform a major compaction to compact all of the data files 520 into one data file. For example, as shown in FIG. 5, the major compaction compacts all of the data files 520-1, 520-2 . . . 520-M into one data file 540. As shown in FIG. 5, the data file 540 may include data entries "KEY-1→V1-2", "KEY-2→V2-1", "KEY-3→V3-1", "KEY-4→V4-1" and so on.

As discussed above, since data compactions (such as, the minor and/or major compactions as shown in FIG. 5) may compete for CPU, memory, disk resources with client applications, it is desirable to optimize data compactions performed at each data node 421 so as to minimize the impact on the performance of the client applications. In some embodiments, information about historical resource usage at a data node 421 and information about historical data compactions performed at the data node 421 is collected. The collected information is analyzed to figure out the usage pattern of resources at the data node 421 and the capability of the data node 421 to perform a minor compaction or a major compaction. Then, a configuration for a data compaction to be performed at the data node 421 is determined based on the result of the analysis. The configuration may define a time window to perform the data compaction, the number of data files and/or the size of data files to be compacted in this data compaction.

Figure 6A:
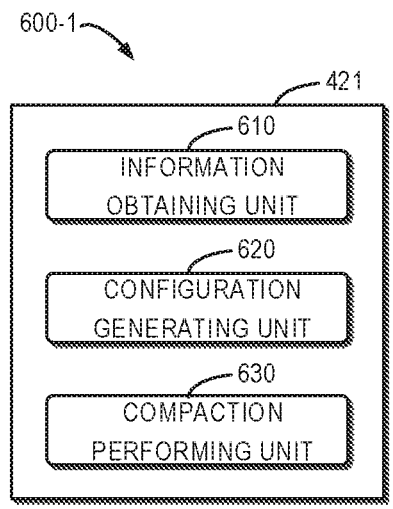
FIGS. 6A-6B depict block diagrams of example systems for compacting data according to embodiments of the present disclosure.

FIG. 6A depicts a block diagram of an example system 600-1 for compacting data according to embodiments of the present disclosure. The system 600-1 may include one or more data nodes 421. For the purpose of illustration, only one data node 421 is shown in FIG. 6A. The data node 421 may include an information obtaining unit 610, a configuration generating unit 620 and a compaction performing unit 630.

In some example embodiments, the information obtaining unit 610 may be configured to obtain the information (also referred to as "first information" in the following paragraphs) about historical resource usage at the data node 421 and the information (also referred to as "second information" in the following paragraphs) about historical data compactions performed at the data node 421. The information obtaining unit 610 may provide the collected information (i.e. the first information and the second information, to the configuration generating unit 620).

In some embodiments, for example, the configuration generating unit 620 may be configured to determine a configuration for a data compaction to be performed at the data node 421 based on the first and second information provided by the information obtaining unit 610. For example, the first and second information may be analyzed to figure out the usage pattern of resources at the data node 421 and the capability of the data node 421 to perform either a minor compaction or a major compaction. Then, the configuration generating unit 620 may generate a configuration for a data compaction to be performed at the data node 421 based on the result of the analysis. The configuration may define a time window to perform the data compaction, the number of data files and/or the size of data files to be compacted in this data compaction. The configuration generating unit 620 may provide the configuration to the compaction performing unit 630.

In some embodiments, the compaction performing unit 630 may be configured to perform the data compaction based on the configuration provided by the configuration generating unit 620.

Figure 6B:
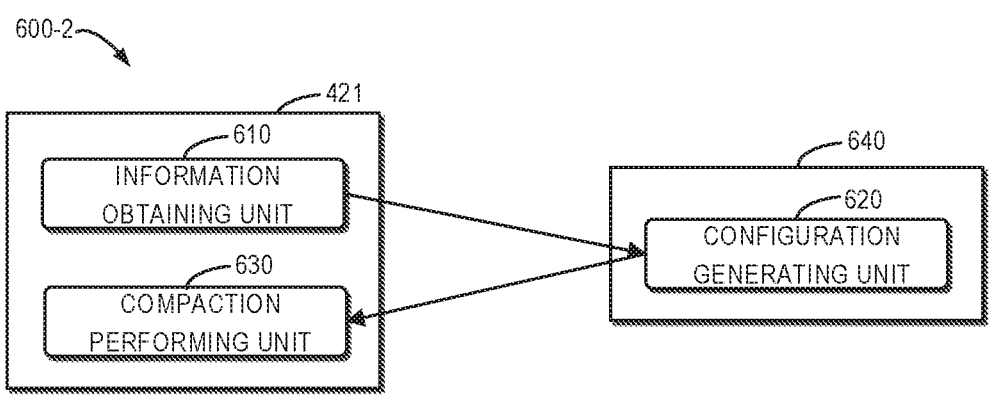

FIG. 6B depicts a block diagram of another example system 600-2 for compacting data according to embodiments of the present disclosure. The system 600-2 may include one or more data nodes and a centralized compaction engine. Only for the purpose of illustration, in FIG. 6B, one data node 421 and a centralized compaction engine 640 are shown. In some embodiments, the data node 421 may only include an information obtaining unit 610 and a compaction performing unit 630. The centralized compaction engine 640 may be a separate device from the data node 421. For example, the centralized compaction engine 640 may be implemented by computer system/server 12 as discussed with reference to FIG. 1. In some embodiments, the centralized compaction engine 640 may include a configuration generating unit 620.

In some embodiments, the information obtaining unit 610 at the data node 421 may be configured to obtain the first and second information as described above and provide the obtained information to the configuration generating unit 620 at the centralized compaction engine 640. In some embodiments, the configuration generating unit 620 at the centralized compaction engine 640 may analyze the information obtained from the data node 421 to figure out the usage pattern of resources at the data node 421 and the capability of the data node 421 to perform a minor compaction or a major compaction. Then, the configuration generating unit 620 may determine a configuration for a data compaction to be performed at the data node 421 based on the result of the analysis. The configuration generating unit 620 at the centralized compaction engine 640 may provide the configuration to the compaction performing unit 630 at the data node 421. The compaction performing unit 630 at the data node 421 may be configured to perform the data compaction based on the configuration provided by the configuration generating unit 620 at the centralized compaction engine 640.

Figure 7:
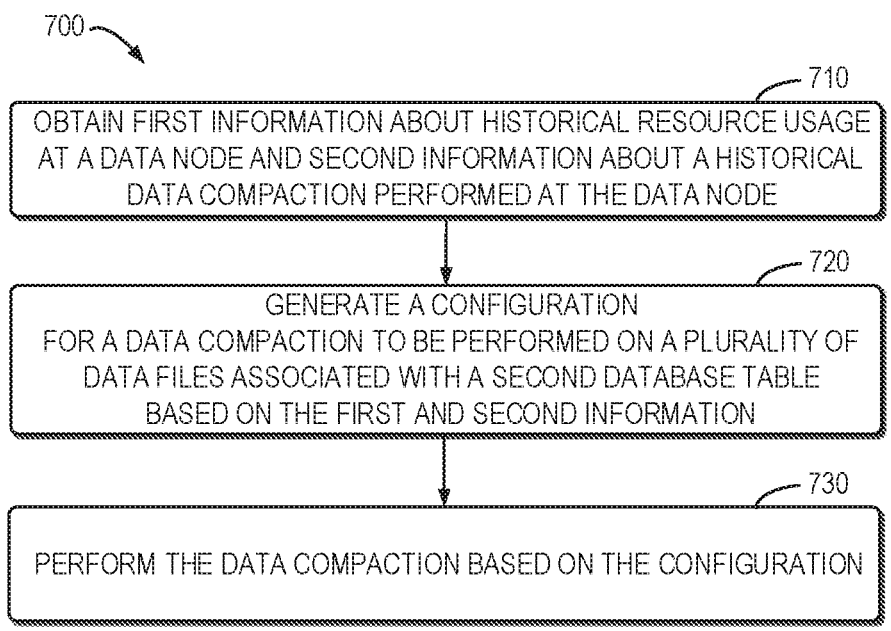
FIG. 7 depicts a flowchart of a method 700 for compacting data according to embodiments of the present disclosure.

FIG. 7 depicts a flowchart of a method 700 for compacting data in accordance with embodiments of the present disclosure. For example, the method 700 may be performed by the system 600-1 (such as, at the data node 421) as shown in FIG. 6A, or by the system 600-2 (such as, at the data node 421 and the centralized compaction engine 640) as shown in FIG. 6B. It is to be understood that the method 700 may also comprise additional blocks (not shown) and/or may omit the illustrated blocks. The scope of the present disclosure described herein is not limited in this aspect.

At block 710, first information about historical resource usage at a data node 421 and second information about a historical data compaction performed at the data node 421 are obtained. The historical data compaction compacted data files associated with a first database table into one data file.

In some embodiments, the historical resource usage may include at least one of the following: (i) CPU usage during at least one historical time period; (ii) memory consumption during the at least one historical time period; and (iii) disk usage during the at least one historical time period.

Figure 8A:
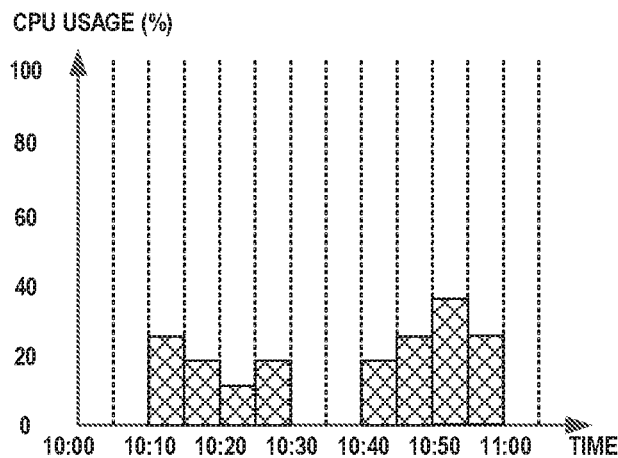
FIGS. 8A-8C depict example diagrams of historical resource usage obtained at a data node according to embodiments of the present disclosure.
Figure 8B:
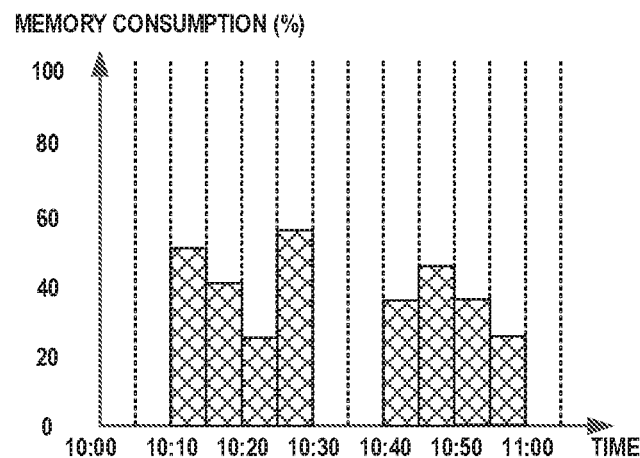
Figure 8C:
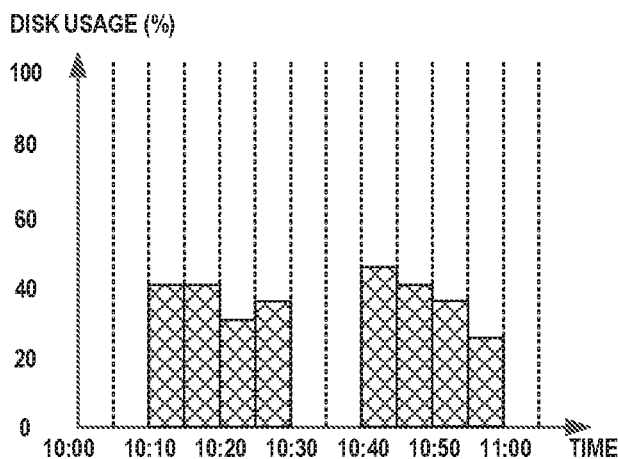

FIGS. 8A-8C depict example diagrams of historical resource usage obtained at a data node (such as, the data node 421) in accordance with embodiments of the present disclosure. As shown in FIG. 8A, for example, the data node 421 may record CPU usage periodically (for example, every 5 minutes). As shown in FIG. 8B, for example, the data node 421 may record memory consumption at the data node 421 periodically (for example, every 5 minutes). As shown in FIG. 8C, for example, the data node 421 may also record disk usage at the data node 421 periodically (for example, every 5 minutes).

In some embodiments, the recorded information may be further analyzed to figure out the usage pattern of resources at the data node 421. For example, an average resource usage at the data node 421 during a plurality of historical time periods can be determined based on the recorded information.

Tables 1A-1C show average resource usage at a data node 421 during a plurality of historical time periods. The respective resource usage in the plurality of historical time periods can be used to estimate respective resource usage in a plurality of future time periods.

TABLE 1

Average CPU usage at a data node

| | Time Period | | | | | |
|---|---|---|---|---|---|---|
| | Monday 10:10-10:20 | Monday 10:20-10:30 | Monday 10:30-10:40 | Monday 10:40-10:50 | Monday 10:50-11:00 | ... |
| Average CPU usage | 20% | 13% | 0% | 20% | 25% | ... |

TABLE 2

Average memory consumption at the data node

| | Time Period | | | | | |
|---|---|---|---|---|---|---|
| | Monday 10:10-10:20 | Monday 10:20-10:30 | Monday 10:30-10:40 | Monday 10:40-10:50 | Monday 10:50-11:00 | ... |
| Average memory consumption | 45% | 40% | 0% | 40% | 30% | ... |

TABLE 3

Average disk usage at the data node

| | Time Period | | | | | |
|---|---|---|---|---|---|---|
| | Monday 10:10-10:20 | Monday 10:20-10:30 | Monday 10:30-10:40 | Monday 10:40-10:50 | Monday 10:50-11:00 | ... |
| Average disk usage | 40% | 33% | 0% | 43% | 30% | ... |

In some embodiments, when the historical data compaction was performed at the data node 421, information (that is, the second information) about the historical data compaction may be collected and recorded at the data node 421. As such, the data node 421 may obtain the second information about the historical data compaction if needed. The second information about the historical data compaction may indicate at least one of the following: (i) CPU usage caused by the historical data compaction; memory consumption caused by the historical data compaction; (ii) the number of input or output operations caused by the historical data compaction; a size of the data files compacted by the historical data compaction; and (iii) a time duration of the historical data compaction.

In some embodiments, the historical data compaction may be a major compaction, or a minor compaction performed at the data node 421 previously. For example, the second information may indicate that: (i) a total size of the data files compacted by the historical data compaction was 100 MB; (ii) the CPU usage caused by the historical data compaction was 50%; and (iii) the historical data compaction lasted 10 seconds.

In some embodiments, the second information may be analyzed to determine the capability of the data node 421 to perform a data compaction. For example, if the recorded information about the historical data compaction indicates: (i) the total size of the data files compacted by the historical data compaction is 100 MB; (ii) the CPU usage caused by the historical data compaction is 50%; and (iii) the historical data compaction lasted 10 seconds. The capability of the data node to perform a data compaction can be determined as: 100/50%/10=20 MB per second per CPU, which means that the data node 421 can compact 20 MB data files every second by leveraging 100% CPU usage.

At block 720, a configuration for a data compaction to be performed on a plurality of data files associated with a second database table is generated based on the first and second information. The configuration may indicate that at least a part of the plurality of data files are to be compacted into one data file during a future time period.

In some embodiments, the second database table may be different from the first database table. Alternatively, in some embodiments, the second database table may be the same as the first database table. For example, the historical data compaction may have compacted some data files associated with the first database table during a historical time period. After that, parallel incoming writes to the first database table may continue to occur, which results in a plurality of data files associated with the first database table needing to be compacted.

FIG. 9 depicts a flowchart of a method 900 for generating a configuration for a data compaction in accordance with some embodiments of the present disclosure. The method 900 can be considered as an example implementation of block 720 in FIG. 7. It is to be understood that the method 900 may also include additional blocks (not shown) and/or may omit some illustrated block. The scope of the present disclosure described herein is not limited in this aspect.

At block 910, in response to respective data files associated with a plurality of database tables being stored at the data node 421, respective priorities for the plurality of database tables may be determined.

In some embodiments, for a database table in the plurality of database tables, a priority may be determined based on at least one of the following: (i) the number of data files associated with the database table; (ii) an estimation of a time for a future access to the database table (also represented as "time_to_next_access" in the following); and (iii) an estimation of an amount of data to be accessed in the future access (represented as "size_of_next_access" in the following). It is to be understood that the time for a future access to the database table and/or the amount of data to be accessed in the future access can be estimated with any technology currently known or to be developed in the future. For example, in some embodiments, information about historical accesses to the database table can be collected and recorded at the data node 421. As such, the time for a future access to the database table and/or the amount of data to be accessed in the future access can be estimated based on the information about the historical accesses to the database table.

In some embodiments, for example, according to respective numbers of data files associated with the plurality of database tables, the plurality of database tables can be divided into different tiers. For example, a first tier may include those database tables each associated with multiple data files of which the number exceeds a first threshold number (such as, 500 files). A second tier may include those database tables each associated with multiple data files of which the number exceeds a second threshold number (such as, 100 files) but below the first threshold number. A third tier may include those database tables each associated with multiple data files of which the number is below the second threshold number.

In some embodiments, for different database tables in different tiers, a database table belonging to the first tier may have a higher priority than a database table belonging to the second or third tier, while a database table belonging to the second tier may have a higher priority than a database table belonging to the third tier. That is, a database table associated with more data files to be compacted will have a higher priority than another database table associated with less data files to be compacted.

Alternatively, or in addition, in some embodiments, for different database tables in a same tier, a priority of a database table may be proportional to the ratio of "size_of_next_access" and "time_to_next_access". For example, for different database tables in a same tier, a priority of a database table may be determined as: $\beta$size_of_next_access/time_to_next_access, where $\beta$ may be a predefined fixed coefficient. That is, a database table that is estimated to be accessed earlier (for example, having a lower value of "time_to_next_access") may have a higher priority than another database table that is estimated to be accessed later (for example, having a higher value of "time_to_next_access"). A database table of which more data is estimated to be accessed may have a higher priority than another database table of which less data is estimated to be accessed.

In response to determining respective priorities for the plurality of database tables, at block 920, a database table associated with the highest priority may be selected from the plurality of database tables.

At block 930, a future time period is determined for performing a data compaction on a plurality of data files associated with the selected database table.

In some embodiments, as described above, the first information may indicate respective resource usage during a plurality of historical time periods. In this event, respective resource usage during a plurality of future time periods corresponding to the plurality of historical time periods may be estimated base on the first information. For example, resource usage during a time period (such as, 10:00-10:10) on next Monday can be estimated based on average resource usage during the same time period (such as, 10:00-10:10) on previous Mondays. Examples of the average resource usage during historical time periods may be shown in Tables 1-3. For example, as shown in Table 1, if average CPU usage during 10:00-10:10 on previous Mondays is 20%, then the estimated CPU usage during 10:00-10:10 on next Monday may be also 20%. As shown in Table 3, if average disk usage during 10:20-10:30 on previous Mondays is 33%, then the estimated disk usage during 10:20-10:30 on next Monday may be also 33%. In some embodiments, the future time period for performing a data compaction regarding the selected database table can be selected from the plurality of future time periods, such that the estimated resource usage in the future time period is below a threshold usage amount. In this way, the data compaction will be performed during a non-busy period, which will have minimal impact on the resource usage by the client application.

At block 940, it is determined whether the future time period is sufficient to compact all of the plurality of data files associated with the selected database table into one data file (that is, whether the future time period is sufficient for a major compaction).

In some embodiments, for example, an amount of resources available for the data compaction in the future time period may be estimated based on the first information. For example, if the estimated CPU usage during the future time period is 50%, then 50% CPU usage may be left for the data compaction. Likewise, if the estimated disk usage during the future time period is 80%, then 20% disk usage may be available for the data compaction.

In some embodiments, whether the future time period is sufficient for a major compaction may be determined based on the second information and the estimated amount of available resources. For example, if the total size of the plurality of data files to be compacted is 100 MB, the CPU usage available for a data compaction is 50% and the capability of the data node to perform a data compaction is 20 MB per second per CPU, the duration of a major compaction will be: 100/(50%·20)=10 seconds. That is, if the future time period is below 10 seconds, the future time period will be insufficient for a major compaction. Otherwise, the future time period will be sufficient for a major compaction.

In response to determining that the future time period is sufficient for a major compaction, at block 950, the configuration may be generated to indicate that the major compaction is to be performed during the future time period.

In response to the future time period being insufficient for a major compaction, at block 960, whether the future time period is sufficient to compact a part of the plurality of data files associated with the second database table into one data file (that is, whether the future time period is sufficient for a minor compaction) is determined. In some embodiments, the determination can be performed in a similar way to block 940, which will not be repeated here. This minor compaction is a contingency where the future time period is insufficient for a major compaction.

In response to determining that the future time period is sufficient for a minor compaction, at block 970, the configuration may be generated to indicate that the minor compaction is to be performed during the future time period. Otherwise, the method 900 may proceed to block 920, where another database table associated with the second highest priority can be selected from the plurality of database tables.

Alternatively, in some embodiments, if the future time period is insufficient for a major compaction, a number or a size of data files that can be compacted into one data file within the future time period can be determined based on the second information and the estimated amount of available resources. In this event, the configuration may be directly generated to indicate that the determined number of data files or the determined size of data files are to be compacted into one data file during the future time period.

In some embodiments, the method 900 may be performed iteratively multiple times, until data compactions regarding the plurality of database tables are completed.

With reference back to FIG. 7, at block 730, the data compaction is performed based on the generated configuration. In some embodiments, as described above, the generated configuration may indicate that at least a part of the plurality of data files associated with the second database table are to be compacted into one data file during a future time period. As such, the data compaction may be performed by compacting the at least a part of the plurality of data files associated with the second database table into one data file during the future time period based on the configuration.

It can be seen that, according to embodiments of the present invention, information about historical resource usage at a data node and information about historical data compactions performed at the data node can be collected. The collected information can be analyzed to figure out the usage pattern of resources at the data node and the capability of the data node to perform a minor compaction or a major compaction. A configuration for a data compaction to be performed at the data node can be generated based on the result of the analysis. The generated configuration can define a time window to perform the data compaction, the number of data files and/or the size of data files to be compacted in this data compaction. The data compaction will be performed based on the generated configuration. As such, the resource usage will be considered when performing a data compaction, such that the data compaction will have minimal impact on the performance of the business processes. Moreover, by estimating the resource usage pattern in the future, the workload of the distributed storage system can be adjusted more efficiently.

It should be noted that the processing of the data compaction according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a first information data set including information indicative of historical resource usage of a data node and a second information data set including information indicative of a historical data compaction performed at the data node, where the historical data compaction compacted data files associated with a first database table into one historical data file;
   segregating a plurality of data files by tier-level, wherein boundaries of each tier-level is based on a one or more tier-level threshold numbers;
   generating a configuration data set for a data compaction to be performed on the plurality of data files associated with a second database table based on the first and second information data sets, the configuration data set indicating that at least a part of the plurality of data files are to be compacted into one data file during a future time period;

prioritizing the plurality of data files based on the tier-level, wherein lowest tier-level has the lowest priority level and highest tier-level has the highest priority level;

determining whether the future time period is sufficient for performing a major data compaction;

responsive to having determined that the future time period is sufficient, performing the major data compaction during the future time period based on the configuration data set.

2. The computer-implemented method of claim 1, wherein the first information data set indicates at least one of the following:

CPU usage during at least one historical time period;

memory consumption during the at least one historical time period; and disk usage during the at least one historical time period.

3. The computer-implemented method of claim 1, wherein the second information data set indicates at least one of the following:

CPU usage caused by the historical data compaction;

memory consumption caused by the historical data compaction;

disk usage caused by the historical data compaction;

a size of the data files compacted by the historical data compaction; and a time duration of the historical data compaction.

4. The computer-implemented method of claim 1, wherein the data node stores respective data files associated with a plurality of database tables including the first and second database tables, and generating the configuration data set comprises:

determining respective priorities for the plurality of database tables;

selecting the second database table from the plurality of database tables, wherein the second database table is associated with a highest priority among the respective priorities;

generating the configuration data set based on the second database table.

5. The computer-implemented method of claim 4, wherein determining respective priorities for the plurality of database tables comprises:

determining a priority for a database table in the plurality of database tables based on at least one of the following:

a number of data files associated with the database table, an estimation of a time for a future access to the database table, and an estimation of an amount of data to be accessed in the future access.

6. The computer-implemented method of claim 1, wherein the first information indicates respective resource usages during a plurality of historical time periods, and generating the configuration data set comprises:

estimating respective resource usages at the data node during a plurality of future time periods corresponding to the plurality of historical time periods based on the first information;

selecting the future time period from the plurality of future time periods, wherein the estimated resource usage in the future time period is below a threshold usage amount; and generating the configuration data set based on the future time period.

7. The computer-implemented method of claim 1, wherein generating the configuration data set comprises:

estimating an amount of resources available for the data compaction in the future time period based on the first information data set;

determining whether the future time period is sufficient to compact the plurality of data files into one data file based on the second information data set and the estimated amount of resources; and in response to determining that the future time period is sufficient to compact the plurality of data files into one data file, generating the configuration data set indicating that the plurality of data files is to be compacted into one data file during the future time period.

8. The computer-implemented method of claim 7, wherein generating the configuration data set further comprises:

in response to determining that the future time period is insufficient to compact the plurality of data files into one data file, determining whether the future time period is sufficient to compact a contingent part of the plurality of data files into one data file; and in response to determining that the future time period is sufficient to compact the contingent part of the plurality of data files into one data file, generating the configuration data set indicating that the contingent part of the plurality of data files are to be compacted into one data file during the future time period.

9. The computer-implemented method of claim 1, wherein the first database table and the second database table are a same database table.

10. A computer system comprising:

one or more computer processors;

a computer readable storage device; and computer code stored on the computer readable storage device, with the computer code including instructions for causing the one or more computer processors to perform operations including the following:

obtaining a first information data set including information indicative of historical resource usage of a data node and a second information data set including information indicative of a historical data compaction performed at the data node, where the historical data compaction compacted data files associated with a first database table into one historical data file, segregating a plurality of data files by tier-level, wherein boundaries of each tier-level is based on a one or more tier-level threshold numbers, generating a configuration data set for a data compaction to be performed on the plurality of data files associated with a second database table based on the first and second information data sets, the configuration data set indicating that at least a part of the plurality of data files are to be compacted into one data file during a future time period, prioritizing the plurality of data files based on the tier-level, wherein lowest tier-level has the lowest priority level and highest tier-level has the highest priority level, determining whether the future time period is sufficient for performing a major data compaction, responsive to having determined that the future time period is sufficient, performing the major data compaction during the future time period based on the configuration data set.

11. The computer system of claim 10, wherein the first information indicates at least one of the following:
    CPU usage during at least one historical time period;
    memory consumption during the at least one historical time period; and
    disk usage during the at least one historical time period.

12. The computer system of claim 10, wherein the second information indicates at least one of the following:
    CPU usage caused by the historical data compaction;
    memory consumption caused by the historical data compaction;
    disk usage caused by the historical data compaction;
    a size of the data files compacted by the historical data compaction; and
    a time duration of the historical data compaction.

13. The computer system of claim 10, wherein the data node stores respective data files associated with a plurality of database tables including the first and second database tables, and generating the configuration data set comprises:
    determining respective priorities for the plurality of database tables;
    selecting the second database table from the plurality of database tables, wherein the second database table is associated with a highest priority among the respective priorities;
    generating the configuration data set based on the second database table.

14. The computer system of claim 13, wherein determining respective priorities for the plurality of database tables comprises:
    determining a priority for a database table in the plurality of database tables based on at least one of the following:
        a number of data files associated with the database table,
        an estimation of a time for a future access to the database table, and
        an estimation of an amount of data to be accessed in the future access.

15. The computer system of claim 10, wherein the first information indicates respective resource usages during a plurality of historical time periods, and generating the configuration data set comprises:
    estimating respective resource usages at the data node during a plurality of future time periods corresponding to the plurality of historical time periods based on the first information data set;
    selecting the future time period from the plurality of future time periods, wherein the estimated resource usage in the future time period is below a threshold usage amount; and
    generating the configuration data set based on the future time period.

16. The computer system of claim 10, wherein generating the configuration data set comprises:
    estimating an amount of resources available for the data compaction in the future time period based on the first information data set;
    determining whether the future time period is sufficient to compact the plurality of data files into one data file based on the second information data set and the estimated amount of resources; and in response to determining that the future time period is sufficient to compact the plurality of data files into one data file, generating the configuration data set indicating that the plurality of data files is to be compacted into one data file during the future time period.

17. The computer system of claim 16, wherein generating the configuration data set further comprises:
    in response to determining that the future time period is insufficient to compact the plurality of data files into one data file, determining whether the future time period is sufficient to compact a contingent part of the plurality of data files into one data file; and
    in response to determining that the future time period is sufficient to compact the contingent part of the plurality of data files into one data file, generating the configuration data set indicating that the contingent part of the plurality of data files are to be compacted into one data file during the future time period.

18. The computer system of claim 10, wherein the first database table and the second database table are a same database table.

19. A computer program product comprising:
    a computer readable storage device; and
    computer code stored on the computer readable storage device, with the computer code including instructions for causing one or more computer processors to perform operations including the following:
        obtaining a first information data set including information indicative of historical resource usage of a data node and a second information data set including information indicative of a historical data compaction performed at the data node, where the historical data compaction compacted data files associated with a first database table into one historical data file,
        segregating a plurality of data files by tier-level, wherein boundaries of each tier-level is based on a one or more tier-level threshold numbers,
        generating a configuration data set for a data compaction to be performed on the plurality of data files associated with a second database table based on the first and second information data sets, the configuration data set indicating that at least a part of the plurality of data files are to be compacted into one data file during a future time period,
        prioritizing the plurality of data files based on the tier-level, wherein lowest tier-level has the lowest priority level and highest tier-level has the highest priority level, and
    determining whether the future time period is sufficient for performing a major data compaction, and
        responsive to having determined that the future time period is sufficient, performing the major data compaction during the future time period based on the configuration data set.

20. The computer program product of claim 19, wherein the first information indicates respective resource usages during a plurality of historical time periods, and generating the configuration data set comprises:
    estimating respective resource usages at the data node during a plurality of future time periods corresponding to the plurality of historical time periods based on the first information data set;

selecting the future time period from the plurality of future time periods, wherein the estimated resource usage in the future time period is below a threshold usage amount; and
generating the configuration data set based on the future time period.

* * * * *